US006623818B2

(12) United States Patent
Nakamura et al.

(10) Patent No.: US 6,623,818 B2
(45) Date of Patent: Sep. 23, 2003

(54) RECORDING MEDIUM FOR PRINTER

(75) Inventors: Yoshinori Nakamura, Kanagawa (JP); Kengo Ito, Miyagi (JP)

(73) Assignee: Sony Corporation, Tokyo (JP)

( * ) Notice: Subject to any disclaimer, the term of this patent is extended or adjusted under 35 U.S.C. 154(b) by 16 days.

(21) Appl. No.: 09/880,739

(22) Filed: Jun. 13, 2001

(65) Prior Publication Data

US 2001/0046591 A1 Nov. 29, 2001

Related U.S. Application Data

(62) Division of application No. 09/352,752, filed on Jul. 14, 1999, now abandoned.

(30) Foreign Application Priority Data

Jul. 17, 1998 (JP) ........................................ P10-203901

(51) Int. Cl.[7] .................................................. B32B 3/00
(52) U.S. Cl. ................. 428/32.25; 428/32.3; 428/32.28
(58) Field of Search ................................ 428/195, 500, 428/522, 32.24, 32.25, 32.3

(56) References Cited

U.S. PATENT DOCUMENTS 6,281,270 B1 * 8/2001 Ito et al. .................... 523/161

* cited by examiner

*Primary Examiner*—Bruce H. Hess
*Assistant Examiner*—Michael E. Grendzynski
(74) *Attorney, Agent, or Firm*—Sonnenschein, Nath & Rosenthal LLP

(57) ABSTRACT

In a recording medium for a printer having a dye fixation layer mainly composed of an interlayer compound for receiving and holding a water-soluble dye by an intercalation reaction, and a binder, the ink is to be improved in ink absorption, fixation, water-proofness and bleeding characteristics to enable image formation to a high resolution. A dye fixation layer 3, mainly composed of an interlayer compound for fixing and holding the water-soluble dye by the intercalation reaction derived from the ion exchange action and the binder is formed as an outermost layer on a substrate 2. The binder of the dye fixation layer 3 contains the urethanated polyvinyl alcohol resin having an urethanation ratio of 1 to 20 mol %.

7 Claims, 1 Drawing Sheet

RECORDING MEDIUM FOR PRINTER

RELATED APPLICATION DATA

This application is a divisional of copending application Ser. No. 09/352,752 filed Jul. 14, 1999, abandoned, New Attorney Docket No. 09792909-4258, Old Attorney Docket No. P99,0913. The present and foregoing application claims priority to Japanese application No. P10-203901 filed Jul. 17, 1998. All of the foregoing applications are incorporated herein by reference to the extent permitted by law.

BACKGROUND OF THE INVENTION

1. Field of the Invention

This invention relates to a recording medium for a printer having a dye fixing layer containing an interlayer compound and a binder, wherein the interlayer compound fixes and holds a water-soluble dye by an intercalation reaction which is based on an intercalation reaction. More particularly, it relates to an improvement in a binder used for the dye fixing layer.

2. Description of the Related Art

Among the methods for outputting the picture information or letter code information, formulated by a personal computer or a word processor, on a recording medium for a printer, such as an overhead projector, referred to below as an OHP sheet, there is known an ink jet recording method in which an ink containing a water-soluble dye is emitted to the recording medium for the printer via a recording nozzle operating under electrolysis or thermal pressure as a driving source to form an image on the recording medium for the printer.

This ink jet recording system is recently finding increasing use in homes and in offices because it has many advantages, such that the recording noise is small, running costs are low, an image can be formed on ordinary paper sheets and no waste materials, such as ink ribbons, are produced.

Meanwhile, the water-soluble dye, used in such ink jet recording system, is usually held by the reciprocal action, such as Van del Val's force with the dye fixing layer constituting portion, or by the hydrogen bond, after the water-soluble dye is transferred to the dye fixing layer of the recording medium for the printer. Therefore, if, after image formation, a solvent exhibiting higher affinity to the dye, such as water, is contacted with the image, this solvent is dissolved from the dye fixing layer to blur the image. Moreover, if the thermal energy or water steam sufficient to cancel the Van del Val's force between the water-soluble dye constituting the image and the dye fixing layer constituting portion or the hydrogen bond is supplied to the recording medium for the printer, the water-soluble dye is migrated to blur the produced image. In addition, if the water-soluble dye constituting the image is exposed to the high energy light rays, such as ultra-violet rays, the image tends to be faded or changed in color or lowered in the gray level of the image due to decomposition of the dye itself.

For improving the fixation, for example, water-proofness, of an image in such ink jet recording system, there is proposed a recording medium for the printer in which the dye is fixed and held on the dye fixation layer by an intercalation reaction which is based on the ion exchange operation. Specifically, there is proposed in Japanese Laying-Open Patent H-7-69725 a recording medium for a printer having a dye fixation layer containing an interlayer compound for fixing and holding the dye by the intercalation reaction and a hydrophilic binder resin, such as a polyvinyl pyrrolidone resin, a polyvinyl butyral resin, a hydroxy propyl cellulose resin or a polyvinyl alcohol resin.

However, this recording medium for the printer, while being improved in ink fixation and resistance to color fading or color change on storage or to lowering of the gray level, is not optimum in ink absorption or water-proofness. In particular, in a portion of the recording medium for the printer where there are deposited ink liquid droplets to high density, the ink liquid droplets are mixed together before being absorbed in the dye reception layer of the recording medium for the printer to deteriorate the image resolution.

SUMMARY OF THE INVENTION

It is therefore an object of the present invention to provide a recording medium for the printer having a dye fixation layer mainly composed of an interlayer compound for fixing and holding the water-soluble dye by an intercalation reaction and a binder, in which the ink is improved in absorption, fixation, water-proofness and anti-bleeding characteristics to enable an image to be formed to high resolution.

The present inventors have conducted perseverant researches towards accomplishing the above object, and have found that if, in a recording medium for the printer having a dye fixation layer mainly composed of an interlayer compound for fixing and holding the water-soluble dye by an intercalation reaction and a binder for the dye fixation layer, a urethanated polyvinyl alcohol resin, urethanated in a pre-set proportion is used as the binder of the dye fixing layer, a clear image can be held which is free from color bleeding. This finding has led to completion of the present invention.

In one aspect, the present invention provides a recording medium for a printer in which a dye fixation layer mainly composed of an interlayer compound and a binder is formed as an outermost layer on a substrate, in which the interlayer compound fixes and holds a water soluble dye by an intercalation reaction derived from an ion exchange action. The binder for the dye fixation layer contains urethanated polyvinyl alcohol resin, with the urethanation ratio of the urethanated polyvinyl alcohol resin being 1 to 20 mol %.

In another aspect, the present invention provides a recording medium for a printer in which a dye fixation layer mainly composed of an interlayer compound and a binder and at least one ink absorption layer containing an ink absorbing resin are formed sequentially on s substrate. The interlayer compound fixes and holds a water soluble dye by an intercalation reaction derived from an ion exchange action. The binder for the dye fixation layer is a urethanated polyvinyl alcohol resin having an urethanation ratio of 1 mol % to 50 mol %.

The recording medium for the printer according to the present invention uses a material containing an urethanated polyvinyl alcohol resin as a binder, with the urethanation ratio of the urethanated polyvinyl alcohol resin being set to a pre-set range, so that the ink absorption, fixation and water-proofness and the image bleeding characteristics are improved to assure the formation of a high resolution image. Meanwhile, in the recording medium for the printer according to the present invention, an optimum value of the urethanation ratio differs depending on whether or not there is the ink absorption layer on the dye fixation layer, as mentioned above. However, the above characteristics are improved in either cases.

The recording medium for the printer according to the present invention uses, as a binder, a material containing an urethanated polyvinyl alcohol resin, having the urethanation ratio set to a pre-set range, so that the ink absorption, fixation and water-proofness and the image bleeding characteristics are improved to assure the formation of a high-resolution high-quality image.

DESCRIPTION OF THE PREFERRED EMBODIMENTS

Figure 1:
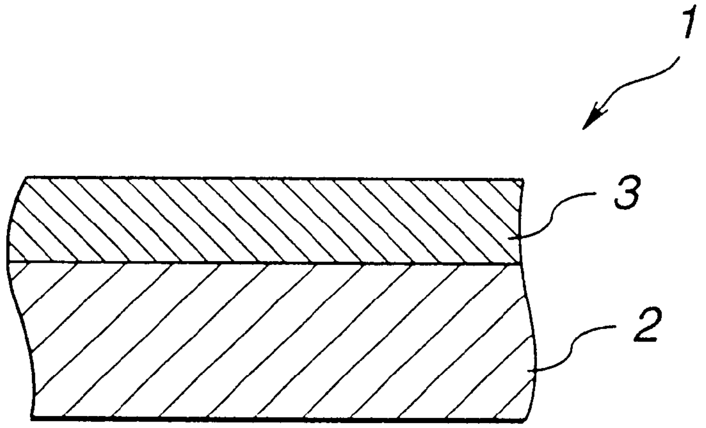
FIG. 1 is a cross-sectional view showing an embodiment of a recording medium for the printer according to the present invention.

Referring to the drawings, preferred embodiments of the present invention will be explained in detail. FIG. 1 shows a cross-section of an embodiment of a recording medium for the printer 1 embodying the present invention.

The recording medium for the printer 1 according to the present invention includes a dye fixation layer 3 for fixing and holding the ink, on a substrate 2, as shown in FIG. 1. For example, in the ink jet recording system, a liquid aqueous ink composition, containing e.g., a water-soluble dye, water and polyhydric alcohol, is emitted from a nozzle of a printer device etc to the dye fixation layer 3 to deposit the water-soluble ink composition on the dye fixation layer 3 to form an image.

The dye fixation layer 3 of the present invention is mainly composed of an interlayer compound for fixing and holding the water-soluble dye by the intercalation reaction which is based on the ion exchange reaction, and a binder. Specifically, the dye fixation layer 3 is of such a structure in which the interlayer compound for fixing and holding the water-soluble dye by the intercalation reaction is dispersed into the binder.

In the present invention, the binder used for the dye fixation layer 3 contains the urethanated polyvinyl alcohol resin. The urethanation ratio (urethane modification ratio) of the urethanated polyvinyl alcohol resin is 1 mol % to 20 mol %. The urethanation ratio herein means the quantity, expressed in mols, of alcoholic groups of the total alcoholic groups of the polyvinyl alcohol resin which has been turned into urethane groups.

If the urethanation ratio is 1 mol % or less, the properties of the polyvinyl alcohol resins are strongly manifested to lower the water-proofness. On the other hand, if the urethanation ratio is nt less than 20 mol %, the prperties of the urethane resin are manifested strongly to lower the ink absorption to produce ink bleeding at higher temperature and humidity.

Thus, with the recording medium for the printer 1 according to the present invention, in which a material containing urethanated polyvinyl alcohol is used as a binder, and the urethanation ratio of the polyvinyl alcohol resin is set at 1 mol % to 20 mol %, it is possible to improve the absorption, fixation or water-proofness of the ink and the image bleeding characteristics to enable the picture to be obtained with high resolution to assure high image quality.

The binder for the dye fixation layer 3 may be comprised of the above-mentioned urethanated polyvinyl alcohol resin added to with a resin dissolved or dispersed in water or water/alcohol. This resin may be enumerated by thermoplastic resins, such as polyvinyl alcohol resin, polyvinyl pyrrolidone resin, polyvinyl acetal resin, polyvinyl butyral resin, urethane resin or polyamide resin, copolymers thereof, and dispersions or emulsions thereof.

According to the present invention, if the amount of the interlayer compound is too small, the amount of the water-soluble dye held by the intercalation reaction is lowered to cause image blurring, whereas, if the amount of the interlayer compound is excessive, the amount of the binder is relatively decreased to lower the bonding or dispersion characteristics of the dye fixation layer 3. Therefore, the weight proportion of the interlayer compound to the binder is preferably 1:0.1 to 1:8 and more preferably 1:0.2 to 1:1.5.

According to the present invention, the interlayer compound used in the dye fixation layer 3 fixes and holds the water-soluble dye in the ink in the dye fixation layer 3 by the intercalation reaction.

Specifically, the interlayer compound may be enumerated by a layered inorganic high molecular material having a layered structure and including between hydrophilic layers thereof exchange ions that can exchange ions with the water-soluble dye. The ion exchange resins of the layered inorganic high molecular material are exchange cations, such as sodium ions, or exchange anions, such as carboxylic anions, if the water-soluble dye is the water-soluble cationic dye or a water-soluble anionic dye, respectively.

The layered inorganic high molecular material having exchange anions employed in the present invention, referred to below as an anionic exchange layered compound, is preferably a sort of the 0:1 type clayey mineral and specifically an mineral of a hydrotalcite group comprised of an $AlO_6$ octahedral sheet and which is represented by at least one of the following compound 7 or 8:

$$[M_{1-x}^{1}M_{x}^{2}(OH)_2]^{+x}[A_{x/n}mH_2O]^{-x} \quad (7)$$

where $M^1$ is a divalent metal selected from the group consisting of Mg, Zn, Ni and Ca, $M^2$ is a trivalent metal ion, A is a n-valent anion, and x and mn denote integers such that $0.1<x<0.4$ and $0<m<2$;

$$[LiAl_2(OH)_6]^{+1}[A_{1/n}.mH_2O]^{-1} \quad (8)$$

where A is a n-valent anion and mn is an integer such that $0<m<2$.

Typical of the minerals of the hydrotal cite group is a natural mineral of the hydrotalcite group represented by the following compound 9:

$$Mg_6Al_2(OH)_{16}.CO_3.4H_2O \quad (9).$$

Meanwhile, synthetic hydrotalcite may also be used, although it has a slightly different composition from that of natural hydrotalcite of the above chemical formula 9. Although the fine particles of this synthetic fine hydrotalcite particles contains no foreign matter and presents a pure white color, the crystal itself is optically transparent, such that, if these fine pareticles are used, it is possible to form a dye fixation layer that is able to realize high saturation comparable with that of a halide photograph.

In addition to the above-mentioned minerals of the hydrotalcite group, there are, as an anion exchange layered compound, a hydrous oxide of titanium, zirconium, lanthanum and bismuth, and acid salts of phosphorus hydroxide. Since these present optical hiding properties or present inherent colors, it is possible to use then in the dye fixation layer for which transparency; luster and white color are not required simultaneously.

The exchange anions which should be present between the layers of the layered anionic exchange compounds, used in the present invention, may be enumerated by inorganic anions solvated with high dielectric constant mediums, such as water or alcohol, for example, hydrophilic organic anions, such as $NO^{3-}$, $SO_4^{2-}$, $ClO_4^-$, $Fe(CN)_6^{4-}$, hetero polyphosphoric acid ions or lower carboxylate ions. The higher carboxylate ions are not desirable in that the higher carboxylate ions tend to give an interlayer which is more difficult to solvate than the above-mentioned anions.

For improving dispersibility of the anion exchange interlayer compound with respect to the binder and the swelling properties with respect to the non-aqueous solvents, such as alcohols, part of the exchange anions of the anionic exchange interlayer compound may be replaced by an organic anion which realizes the effect of enlarging the interlayer distance (pillar effect) or of imparting partially hydrophobic properties to the interlayer.

These organic anions are enumerated by, for example, carboxylic acid anions, sulfonic acid anions, ester anions and phosphate anions. These organic anions, usually including alkyl or alkenyl groups, are inferior in the pillar effect if the number of carbon atoms is small such that it becomes difficult to secure an interlayer as the site for fixation (=exchange anions). On the other hand, if the number of carbon atoms is that many, substitution becomes difficult. Therefore, the number of carbons is preferably 5 to 20.

The interlayer inorganic high molecular material having the exchange cations used in the present invention (referred to below as layered cationic exchange compound) may be exemplified by natural or synthetic layered silicates or fired products thereof, with typical such materials being a montmorillonite minerals which is a sort of the viscous mineral having a 3-octahydric smectitie structure as shown by the following formula (10):

$$(X,Y)_{2-3}Z_4O_{10}(OH)_2.mH_2O.(W_{1/3}) \qquad (10)$$

where X is Al, Fe(III), Me(III) or Co(III), Y is Mg, Fe(II); Ni, Zn or Li, Z is Si or Al, W is K, Na or Ca, $H_2O$ is an interlayer water and m is an integer.

Specifically, the interlayer inorganic high molecular material may be exemplified by natural or synthetic products, such as montmorillonite, magnesian montmorillonite, iron montmorillonite, iron magnesian montmorillonite, beidellite, aluminian beidellite, nontronite, aluminian nontronite, saponite, aluminian saponite, hectorite or sorconite. Meanwhile, the compound of the formula 10 in which the OH group is relaced by fluorine may also be used.

In addition to the minerals of the montmorillonite group, the minerals of the mica group such as sodium silicic mica, sodium teniorite or lithium teniorite may also be used as the cation exchange interlayer compound.

The cationic exchange interlayer compounds having layered minerals and including exchange cations may be enumerated by acidic salts, such as zirconium phosphate, or layered hydrous titanium hydroxide. Since these have optically hiding colors or intrinsic colors, they may be used if transparency, luster and whiteness are not simultaneously required of the dye fixation layer 3.

If fine particles presenting pure white color, such as synthetic silicate free of foreign matter, are used as the above-mentioned cationic exchange interlayer compounds, the fine pulverulent crystals themselves are optically transparent, so that it is possible to produce a dye fixation layer realizing high saturation comparable to that of a halide photograph.

The exchange cations which should be present between the layers of the cationic exchange layered compound used in the present invention may be enumerated by inorganic cations that may be readily solvated to the high dielectric constant mediums, such as water or alcohols, such as $Li^+$, $Na^+$ or $K^+$, alkali earth metals ions, such as $Mg^{2+}$, and $H^+$, which will give so-called siliceous clay. Of the alkali earth metal ions, $Ca^{+2}$, $Ba^{+2}$ tend to give an interlayer which is more difficult to solvate than the above-mentioned inorganic ions.

For improving the dispersibility of the cationic exchange interlayer compound with respect to the binder and also for improving the swelling with respect to non-aqueous solvents, such as alcohols, part of the exchange cations of the cationic exchange interlayer compound may be replaced by organic cations which realize the effect of enlarging the interlayer distance (pillar effect) or the effect of imparting partially hydrophobic properties to the interlayer. Examples of these organic cations preferably include quaternary ammonium ions or phosphonium ions, such as alkyl phosphonium ions or aryl phosphonium ions. If the organic cations are the above-mentioned quaternary ammonium ions, the number of carbon atoms of at least three of the four alkyl groups is preferably not less than 4 and preferably not less than 8. If the number of the long-chain alkyl in the organic cation is few, the pillar effect is not sufficient to render it difficult to secure an interlayer as a fixation site (=exchange cations). If, for example, n-octyl trimethyl ammonium ions are used, the interlayer spacing is not increased to larger than approximately 4 Å, even if sites for fixation are well-nigh occupied, while there is undesirably afforded an excessively hydrophobic interlayer.

In the present invention, the film thickness of the dye fixation layer 3 is preferably 2 to 40 $\mu$m and more preferably 4 to 15 $\mu$m. If the dye fixation layer 3 is 2 $\mu$m or less in thickness, the dye fixation capability is lowered, whereas, if the dye fixation layer 3 is 40 $\mu$m or more, the desired luster cannot be developed.

If necessary, a variety of additives routinely used in the dye fixation layer of the conventional recording medium for the printer, such as cross-linking agents, plasticizers, antioxidants, ultraviolet light absorbers and fluorescent whitening agents, may be used for the dye fixation layer 3.

The substrate 2 of the present invention may be optionally selected from, for example, paper, synthetic paper, plastic paper, metal sheets, metal foils and plastic films with aluminum deposited thereon. These may be processed with an organic resin for facilitating the adhesion. If the substrate 2 is used for an OHP sheet, for example, the substrate 2 needs to exhibit light transparency.

Figure 2:
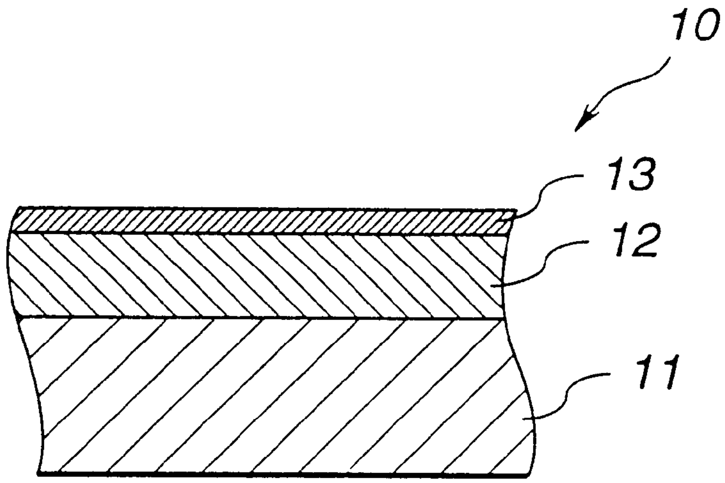
FIG. 2. Is a cross-sectional view showing another embodiment of the recording medium for the printer according to the present invention.

FIG. 2 is a cross-sectional showing a modification of a recording medium for the printer 10 embodying the present invention. With the recording medium for the printer 10 embodying the present invention, a dye fixation layer 12 and an ink absorbing layer 13 are sequentially formed on a substrate 11, as shown in FIG. 2.

The ink absorbing layer 13 transiently absorbs the deposited ink to transfer the ink to the dye fixation layer 12. The ink absorbing layer 13 is formed of an ink absorbing resin. The ink absorbing resin is enumerated by, for example, cellulose resins, such as hydroxy propyl cellulose or methyl cellulose, polyvinyl alcohol resin, gelatin, hydratable polyvinyl acetal resin and polyvinyl pyrrolidone resin.

The film thickness of the ink absorbing layer 13 is usually not larger than 5 $\mu$m and preferably not more than 3 $\mu$m. If the film thickness of the ink absorbing layer 13 is too thick, the proportion of the dye fixed on the dye fixation layer 12 is lowered to worsen the dye fixation.

Thus, in the recording medium for the printer 10 according to the present invention, in which the ink absorbing layer 13 is formed on the dye fixation layer 12, the ink absorption properties may be improved further.

On the other hand, the recording medium for the printer 10 of the present invention is made up of an interlayer compound, in which the dye fixation layer 22 fixes and holds a water-soluble dye by an intercalation reaction derived from the ion exchange reaction, and a binder. It is this binder of the dye fixation layer 12 that contains the urethanated polyvinyl alcohol.

However, since the recording medium for the printer 10 of the present invention is improved in ink absorption by the ink absorbing layer 13, the tolerance of the urethanation ratio of the urethanated polyvinyl alcohol resin contained in the dye fixation layer 12 is higher than that in the above-described recording medium for the printer 1.

That is, in the recording medium for the printer 10 according to the present invention, the urethanation ratio of the urethanated polyvinyl alcohol resin, contained as a binder in the dye fixation layer 12, is preferably set to 1 to 50 mol %

Thus, in the recording medium for the printer 10 according to the present invention, in which a material containing an urethanated polyvinyl alcohol resin is used as a binder and in which the urethanation ratio of the urethanated polyvinyl alcohol resin is set to 1 to 50 mol %, it is possible to improve the ink absorption, fixation and water-proofness and anti-bleeding characteristics of the image to realize a high-resolution high-quality image.

The recording medium for the printer 10 according to the present invention may be configured similarly to the recording medium for the printer 1 described above as to the interlayer compound, binder and the substrate, in respects other than the urethanation ratio of the binder.

The above-described recording medium for the printer 1 according to the present invention may be fabricated by the following conventional method.

First, the interlayer compound and the binder are dispersed in the solvent to prepare a composition for formation of the dye fixation layer. If the fixation characteristics and film-forming properties of the dye are taken into account, it is preferred that the proportions of the interlayer compound, binder and the solvent in the main composition for the formation of the dye fixation layer are 10 to 80 wt %, 50 wt % and 20 to 60 wt %, respectively.

For assuring high dispersion characteristics, it is preferred to use the solvent of a high dielectric constant. As these solvents, lower alcohols, such as isopropanol or ethanol, may be used.

This composition is coated on the substrate 2 by a known coating method and dried to form the dye fixation layer 3 to produce ultimately the recording medium for the printer 1 of the present invention as shown in FIG. 1.

If the silicone oil is to be contained in the dye fixation layer 3, the silicone oil is added to the composition for the formation of the dye fixation layer for coating.

For fabricating the recording medium for the printer 10 having the ink absorbing layer 13, the silicone oil is added to the ink absorbing resin and the resulting assembly is coated on the dye fixation layer 12 and dried.

It is noted that a desirable ink composition for ink jet printing on the recording mediums for the printer 1, 10, according to the present invention, is such a composition containing at least water and a water-soluble dye fixed and held by the intercalation reaction on the interlayer compound contained in the dye fixation layers 3, 12.

As the water-soluble dye, a water-soluble cationic dye, such as w water-soluble basic dye, or a water-soluble anionic dye (water-soluble direct dye or a water-soluble acidic dye, so far known in the art, may be used. The water-soluble cationic dye may be enumerated by, for example, azo dyes, such as amine salts or quaternary ammonium salts, triphenyl methane dye, azo dye, oxadine dye and thiadine dye. On the other hand, the water-soluble anionic dyes may be enumerated by, for example, those having a mono-azo group, di-azo group, an anthraquinone skeleton or a triphenyl methane skeleton, as a coloring group, and also having anionic water-soluble groups, such as 1 to 3 sulfonic or carboxylic groups in the molecule.

The recording mediums for the printer 10 for the printer embodying the present invention may be used similarly to the conventional ink jet recording medium. That is, if an image is to be formed using the recording medium for the printer 1 and the above-mentioned ink composition, it is sufficient if the ink composition is selectively emitted to the dye fixation layer 3 of the recording medium for the printer 1 of the present invention from the ink jet recording device having a bubble-driven jet nozzle or a piezo device driving jet nozzle.

EXAMPLES

The present invention is hereinafter explained with reference to certain preferred Examples based on the experimental results. Specifically, a recording medium for the printer, shown below, was fabricated for evaluating the effect of the present invention.

First, a binder used as the dye fixation layer 2 for the recording medium for the printer 1 having a dye fixation layer 1 on a substrate was scrutinized.

Example 1

To a mixed solution of 8 g of isopropanol and 72 g of water were added, as a binder, 10 g of urethanated polyvinyl alcohol, with an urethanation ratio of 1%, and an organic acid processed hydrotalcite, obtained on adsorbing a 10 mg equivalent of malic acid to 10 g of hydrotalcite. After treatment for eight hours by a beads mill, a dispersion liquid was obtained.

The resulting liquid dispersion was applied by a wire bar on a transparent polyester film (D-535, manufactured by ICI), 100 μm in thickness, processed for facilitating the adhesion, to a dry thickness of 8 μm. The coated liquid dispersion then was dried under a condition of 90° C. for two minutes to form a dye fixation layer.

Then, on this dye fixation layer, a gelatin resin (E-290, manufactured by MIYAGI KAGAKU KOGYO KK, was coated as an ink absorbing resin to a dry thickness of 0.8 μm, and the resulting mass was dried for one minute at a temperature of 90°, to prepare the recording medium for the printer 1 as shown in FIG. 1.

Examples 2 to 5 and Comparative Examples 3 and 5

A recording medium for the printer was fabricated in the same way as in Example 1 except changing the urethanation ratio as shown in Table 1 below.

Comparative Examples 1 and 2

A recording medium for the printer was fabricated in the same way as in Example 1 except using the resin shown in Table 1 below, as a binder in the dye fixation layer, in place of the urethanated polyvinyl alcohol resin Evaluation of Characteristics On the recording mediums for the printer of the Examples 1 to 5 and the Comparative Examples 1 to 4, sample letters were recorded, using a printer of the ink jet recording system (manufactured by HP850C, manufactured by Huelette Packard Inc), to form an image, and ink absorption and fixation as well as image bleeding characteristics were evaluated in the following manner.

1) Test on Ink Absorption

When the image was formed, it was visually checked whether or not the ink was infiltrated into and absorbed by the dye fixation layer, and evaluation was made in accordance with the following standard. The results are shown in Table 1.

○: the ink being infiltrated into and absorbed by the dye fixation layer;

x: the ink not being infiltrated into nor absorbed by the dye fixation layer;

2) Test on Ink Fixation

The entire recording medium for the printer, carrying an image, was dipped in water for ten minutes and hoisted from the water. Then, changes in the dye fixation layer were observed with naked eyes to make evaluations in accordance with the following standard. The results are shown in Table 1.

○: no changes were noticed in the dye fixation layer;

x: the dye fixation layer was detached from the substrate or was dissolved such that the dye fixation layer could not be used as the recording medium for the printer.

3) Tests on Image Bleeding Characteristics

The entire recording medium for the printer, carrying an image, was allowed to stand under an environment of a temperature of 60° C. and a humidity of 85% for 24 hours and the state of subsequent image bleeding on the recording medium for the printer was observed visually to make the evaluation under the following standard. The results are shown in Table 1:

| | urethanation ratio (%) | absorption | fixation | bleeding |
|---|---|---|---|---|
| Ex.1 | 1 | ○ | ○ | ○ |
| Ex.2 | 3 | ○ | ○ | ○ |
| Ex.3 | 5 | ○ | ○ | ○ |
| Ex.4 | 10 | ○ | ○ | ○ |
| Ex.5 | 20 | ○ | ○ | ○ |
| Comp.Ex.1 | polyvinyl alcohol (O) | ○ | x | ○ |
| Comp.Ex.2 | urethane resin | x | ○ | x |
| Comp.Ex.3 | 21 | x | ○ | x |
| Comp.Ex.4 | 25 | x | ○ | x |

As may be seen from the results of Table 1, there are obtained satisfactory results as to the ink absorption or ink fixation or image bleeding characteristics with the Examples 1 to 5 in which there are formed on the substrates dye fixation layers containing urethanated polyvinyl alcohol resin with the urethanation ratio of 1 to 20 mol % as the binder.

On the other hand, with the Comparative Examples 1 and 2 not employing urethanated polyvinyl alcohol resin as the binder for the dye fixation layer, or with the Comparative Examples 3 and 4 with the urethanation ratio outside the range of 1 to 20 mol %, undesirable effects have been obtained at least with respect to one of the ink absorption or fixation and the image bleeding characteristics.

It has been seen from the above results that the recording medium for the printer having the dye fixation layer formed on the substrate is improved in ink absorption or fixation and the image bleeding characteristics by employing urethanated polyvinyl alcohol resin having the urethanation ratio of 1 to 20 mol % as the binder used for the dye fixation layer.

The binder used for the dye fixation layer 12 was checked for the recording medium for the printer 10 having the dye fixation layer and the ink absorption layer sequentially formed on the substrate.

Example 6

Using the urethanated polyvinyl alcohol resin, with the urethanation ratio of 3%, a dye fixation layer was first formed on a substrate, a gelatin resin (F-290 manufactured by MIYAGI KAGAKU KOGYO KK) was coated as an ink absorbing resin on the dye fixation layer to a dry thickness of 0.8 μm. The resulting assembly was dried at 90° C. for one minute to produce a recording medium for the printer shown in FIG. 2.

Examples 7 to 11

The procedure of Example 6 was followed, except changing the urethanation ratio as shown in Table 2, to produce a recording medium for the printer.

Comparative Example 5

The procedure of Example 6 was followed, except using urethane resins in place of the urethanated polyvinyl alcohol resin as the binder for the dye fixation layer, in order to produce the recording medium for the printer in the same way as in Example 6.

Evaluation of Characteristics

On the recording mediums for the printer of the Examples 6 to 11 and in the Comparative Example 5, obtained as described above, sample letters were recorded to form images, and ink absorption and fixation as well as the image bleeding characteristics were evacuated in the following manner. The results are shown in Table 2.

TABLE 2

| | presence/absence of ink absorption layer | urethanation ratio (%) | absorp-tion | fixation | bleeding |
|---|---|---|---|---|---|
| Ex.6 | present | 3 | ○ | ○ | ○ |
| Ex.7 | present | 5 | ○ | ○ | ○ |
| Ex.8 | present | 10 | ○ | ○ | ○ |
| Ex.9 | present | 20 | ○ | ○ | ○ |
| Ex.10 | present | 40 | ○ | ○ | ○ |
| Ex.11 | present | 50 | ○ | ○ | ○ |
| Comp. Ex.5 | present | urethane resin | x | ○ | x |

As may be seen from the results of Table 2, the recording medium for the printer having an ink absorbing layer formed on a dye fixation layer containing the urethanated polyvinyl alcohol resin has superior results as to the ink absorption and fixation and image bleeding properties.

On the other hand, the recording mediums for the printer, having the ink absorbing layer formed on the dye fixation layer containing the urethane resin in place of the urethanated polyvinyl alcohol resin, gave undesirable results particularly with respect to the ink absorption properties and image bleeding characteristics.

It is seen from the above results that, in the recording medium for the printer having the ink absorbing layer, the urethanated polyvinyl alcohol resin is desirable as the binder for the dye fixation layer.

From the results of examples 6 to 11, it has also been seen that ink absorption and fixation as well as image bleeding characteristics are superior if the urethanation ratio of urethanated polyvinyl alcohol resin is smaller than 50%.

Moreover, comparison of the results of tables 1 and 2 reveals that the Examples 6 to 11, having the ink absorbing layers, are broader in the tolerance for the urethanation ratio than the Examples 1 to 5 not having the ink absorbing layers.

From this, it has been seen that the provision of the ink absorbing layer leads to improved ink absorption and fixation properties and to improved image bleeding characteristics.

It has also been seen that if, with the recording medium for the printer having the ink absorbing layer, the urethanation ratio of the urethanated polyvinyl alcohol resin used in the dye fixation layer is 1 to 50%, superior ink absorption and fixation characteristics and image bleeding characteristics are obtained.

What is claimed is:

1. A recording medium for a printer in which a dye fixation layer mainly composed of an interlayer compound and a binder and at least one ink absorption layer containing an ink absorbing resin are formed sequentially on a substrate, said interlayer compound fixing and holding a water soluble dye by an intercalation reaction derived from an ion exchange action, wherein the binder for said dye fixation layer is a urethanated polyvinyl alcohol resin having an urethanation ratio of 1 mol % to 50 mol %.

2. The recording medium for the printer according to claim 1 wherein said interlayer compound is a layered inorganic high molecular material having exchange cations.

3. The recording medium for the printer according to claim 2 wherein the layered inorganic high molecular material having the exchange anions is mainly composed of a mineral of the hydrotalcite group.

4. The recording medium for the printer according to claim 3 wherein said mineral of the hydrotalcite group is at least a compound represented by the following formulas (4) or (5):

$$[M^1_{1-x}M^2_x(OH)_2]^{+x}[A_{x/n}mH_2O]^{-x} \quad (4)$$

where $M^1$ is a divalent metal in selected from the group consisting of Mg, Zn, Ni and Ca, $M^2$ is a trivalent metal ion, A is a n-valent anion, and x and m denote integers such that $0.1<x<0.4$ and $0<m<2$;

$$[LiAl_2(OH)_6]^{+1}[A_{1/n}.mH_2O]^{-1} \quad (5)$$

where A is a n-valent anion and m is an integer such that $0<m<2$.

5. The recording medium for the printer according to claim 1 wherein said interlayer compound is a layered inorganic high molecular material having exchange cations.

6. The recording medium for the printer according to claim 5 wherein said layered inorganic high molecular material having exchange cations is mainly composed of a mineral of the montmorillonite group.

7. The recording medium for the printer according to claim 6 wherein said mineral of the montmorillonite group is composed of a compound represented by the following formula (6):

$$(X,Y)_{2-3}Z_4O_{10}(OH)_2.mH_2O.(W_{1/3}) \quad (6)$$

where X is Al, Fe(III), Me(III) or Co(III), Y is Mg, Fe(II), Ni, Zn or Li, Z is Si or Al, W is K, Na or Ca, $H_2O$ is an interlayer water and m is an integer.

* * * * *